June 16, 1925.

R. V. L. HARTLEY

VACUUM TUBE DESIGN

Filed Dec. 14, 1920

1,542,386

Inventor:
Ralph V. L. Hartley.
by W. E. Beatty, Atty.

Patented June 16, 1925.

1,542,386

UNITED STATES PATENT OFFICE.

RALPH V. L. HARTLEY, OF EAST ORANGE, NEW JERSEY, ASSIGNOR TO WESTERN ELECTRIC COMPANY, INCORPORATED, OF NEW YORK, N. Y., A CORPORATION OF NEW YORK.

VACUUM-TUBE DESIGN.

Application filed December 14, 1920. Serial No. 430,637.

*To all whom it may concern:*

Be it known that I, RALPH V. L. HARTLEY, a citizen of the United States of America, residing at East Orange, in the county of Essex and State of New Jersey, have invented certain new and useful Improvements in Vacuum-Tube Designs, of which the following is a full, clear, concise, and exact description.

This invention relates to the design of electron discharge devices and their use for the measurement of alternating current potentials and has for an object to provide an electron discharge device wherein the curve which represents the relation between the input voltage and the output current shall have a desired shape.

As disclosed in the patent to Heising No. 1,232,919, July 10, 1917, a three-electrode audion may be employed for measuring the voltage between two points in an electrical network without taking power from that network and without introducing frequency errors. As disclosed in that patent, the unknown potential is measured by noting the difference in the value of the negative grid potential required to reduce the space current for the tube to zero when the unknown source is or is not connected to the input circuit of the tube. The accuracy of that arrangement depends upon the accuracy with which the zero value of space current in the output circuit of the tube can be determined. In increasing the negative potential on the grid of an ordinary audion the current in the output circuit does not sharply reduce to zero, but approaches the zero value gradually, due to the fact that different portions of the filamentary cathode stop emitting electrons at different times, the negative end of the filament being the last to remain active.

According to the present invention, the characteristic of the vacuum tube is modified so that the space current, when the grid potential is given increasing negative values, approaches a zero value more rapidly than heretofore, thereby giving a more accurate determination of the value of the negative grid potential required to produce zero space current.

This result is secured by so spacing and shaping the grid as to provide a greater impedance to the flow of electrons from the negative end of the filament than from the positive end, the result being that all parts of the filamentary cathode become active at the same time. This gives a sharp cessation in the space current when the grid potential is given increasing negative values whereby a more accurate measurement of the unknown voltage may be made.

Figure 1:
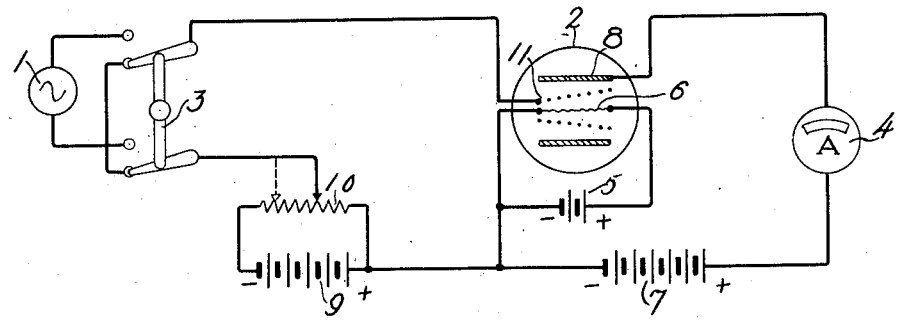
Figure 2:
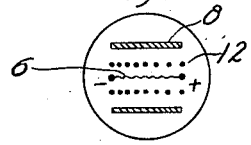
Figure 3:
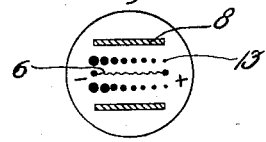
Figure 4:
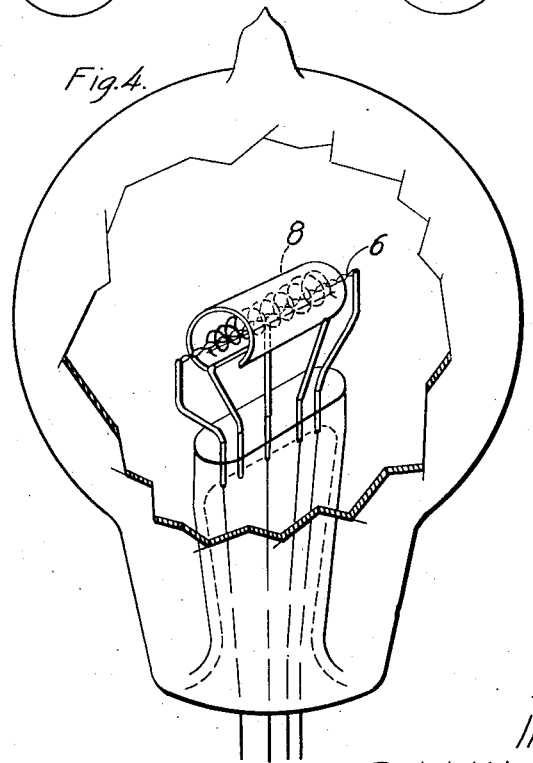

For further details of the invention reference may be made to the drawings, in which Fig. 1 illustrates a circuit for the measurement of current employing an improved type of tube, Figs. 2 and 3 are modified types of tubes, and Fig. 4 is a perspective view of a tube employing the electrode arrangement of Fig. 1.

In the drawing 1 represents a source of voltage to be measured and 2 an electron discharge device which is adapted to be connected to the source 1 at times by the switch 3 and having the current indicating instrument 4 in its output circuit. The battery 5 provides current for heating the filamentary cathode 6; the battery 7 supplies space current between the cathode 6 and the anode 8; and battery 9 in connection with the potentiometer 10 provides a variable source of negative potential for the grid 11 with respect to the cathode 6.

As pointed out in the Heising patent above referred to, the value of the unknown voltage may be measured by taking the difference in the readings on the potentiometer 10 with the switch 3 in the two positions shown, the potentiometer 10 being calibrated in terms of the fall of potential along its length as usual.

According to the present invention, all portions of the filamentary cathode are caused to cease emitting electrons and incidentally to emit electrons at the same moment by tapering the grid so that the impedance to the flow of electrons offered by the grid is graduated in such a manner as to compensate for the fall of potential along the filament. Ordinarily the negative end of the filament 6 starts to emit electrons first, and is last to stop emitting electrons because there is a greater potential between the negative end of the filament and the anode than there is between the positive end of the filament and the anode. This may be compensated for in several ways. As shown in Fig. 1, the grid, which may be made up of two planary sections, or which may be helical as shown in Fig. 4, is arranged so that the portion of the grid adjacent the negative end of the filament is closer to that end than the positive end of the grid is to the positive end of the filament, the varying distance between the different adjacent portions of the grid and filament providing the required variation in impedance to the electron flow.

The desired variation in impedance to the electron flow along the length of the filament may be secured, as shown in Fig. 2, by maintaining the grid 12, which may be helical, equidistant from adjacent points of the filament, the grid turns or laterals being more widely spaced at the positive end of the filament than at the negative end in order to provide the necessary change in impedance along the length of the filament.

Or the desired change in impedance along the length of the filament may be secured, as shown in Fig. 3, by using wires 13 of graduated size instead of uniform size as in Fig. 2, the wires being more closely spaced at the negative end of the filament than at the positive end thereof.

In each of the modifications the desired result is secured with a grid which is an equipotential electrode, thereby making it unnecessary to compensate for the cathode potential drop by a similar potential drop in the grid as is done for instance in the circuit of Langmuir Patent No. 1,273,630, July 23, 1918.

While the improved form of tube has been described as applied to the measurement of potentials, it is of more general application.

What is claimed is:

1. An electron discharge device comprising a multi-potential cathode, an anode and an equipotential control electrode, said control electrode having parts in such space relationship to parts of said cathode as to offer to the flow of electrons between the cathode and anode an impedance which compensates for the drop in potential along the cathode.

2. An electron discharge device comprising a filamentary cathode, a source of current therefor, an equipotential grid surrounding said cathode, an anode surrounding said grid and cathode, and a source for supplying space current between said anode and said cathode, said grid having parts in such space relationship to parts of said cathode as to cause all portions of said cathode to cease emitting electrons simultaneously when said grid is given an arithmetically increasing negative potential with respect to said cathode.

3. The method of obtaining a desired relation between the voltage and current between an anode and a cathode having a control electrode in controlling relation thereto, which comprises gradually varying, from point to point of the cathode the impedance opposed by the control electrode to the flow of electrons from the different points of the cathode, while varying, from point to point of the cathode, the voltage from the different points of the cathode to the immediately adjacent, corresponding points of the control electrode.

4. The method of compensating for the drop in potential along a cathode having a control electrode in controlling relation thereto, which comprises offering different impedances to the flow of electrons from different portions of the cathode while varying, from point to point of the cathode, the voltage from the different points of the cathode to the immediately adjacent, corresponding points of the control electrode.

5. An electron discharge device comprising an anode, a cathode, and an electrode so tapered, and so positioned with respect to said anode and said cathode, as to cause the flow of electrons from different portions of said cathode to said anode to be impeded by amounts which differ in such manner as to compensate for the effect of the voltage drop in said cathode upon said electron flow.

In witness whereof I hereunto subscribe my name this 13th day of December A. D., 1920.

RALPH V. L. HARTLEY.